Jan. 12, 1954
F. W. HENSLEE
2,665,491
MICROMETER THREAD GAUGE
Filed April 14, 1950
3 Sheets-Sheet 1
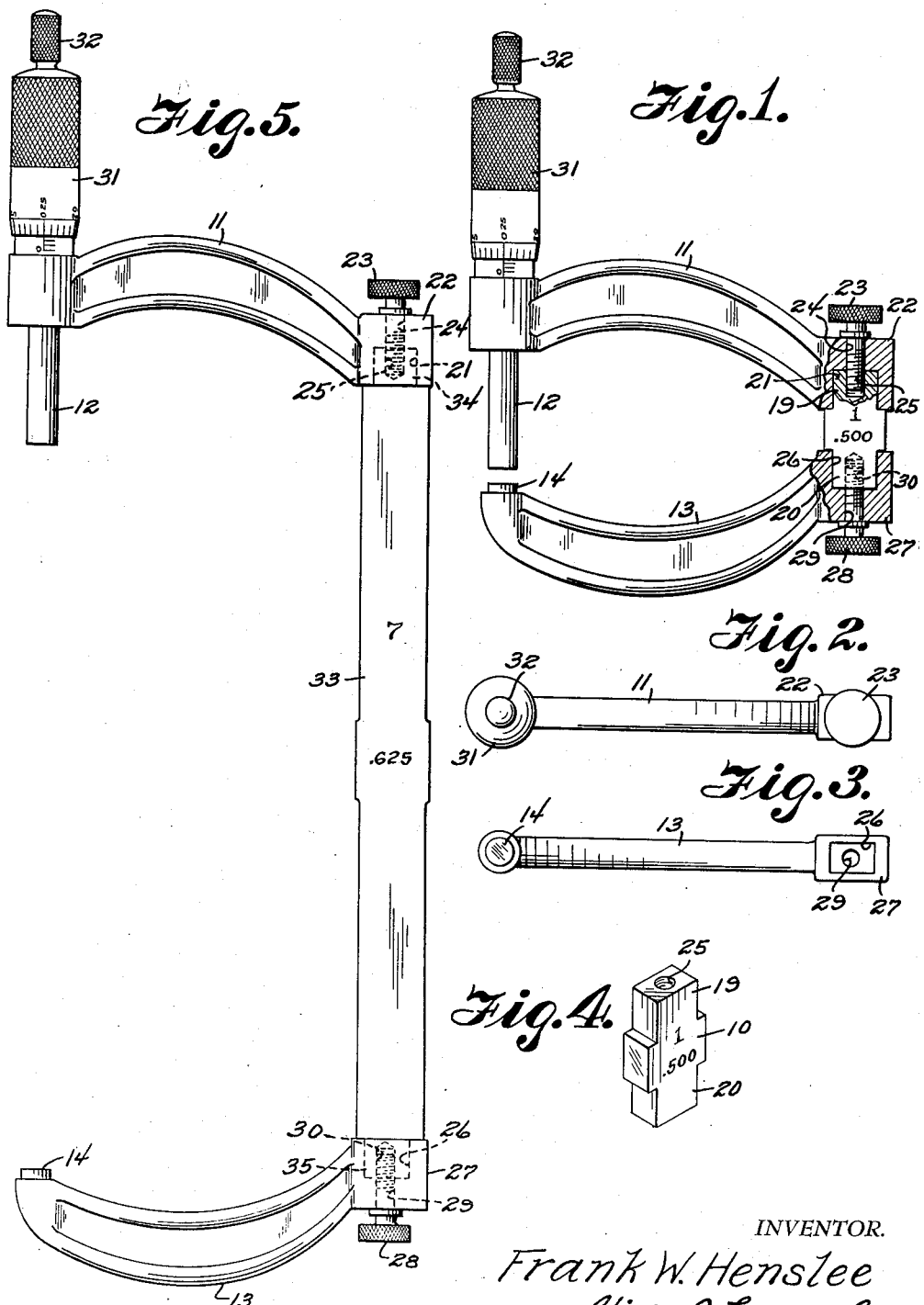
INVENTOR.
Frank W. Henslee
BY Victor J. Evans & Co.
ATTORNEYS Jan. 12, 1954     F. W. HENSLEE     2,665,491
MICROMETER THREAD GAUGE
Filed April 14, 1950     3 Sheets-Sheet 2
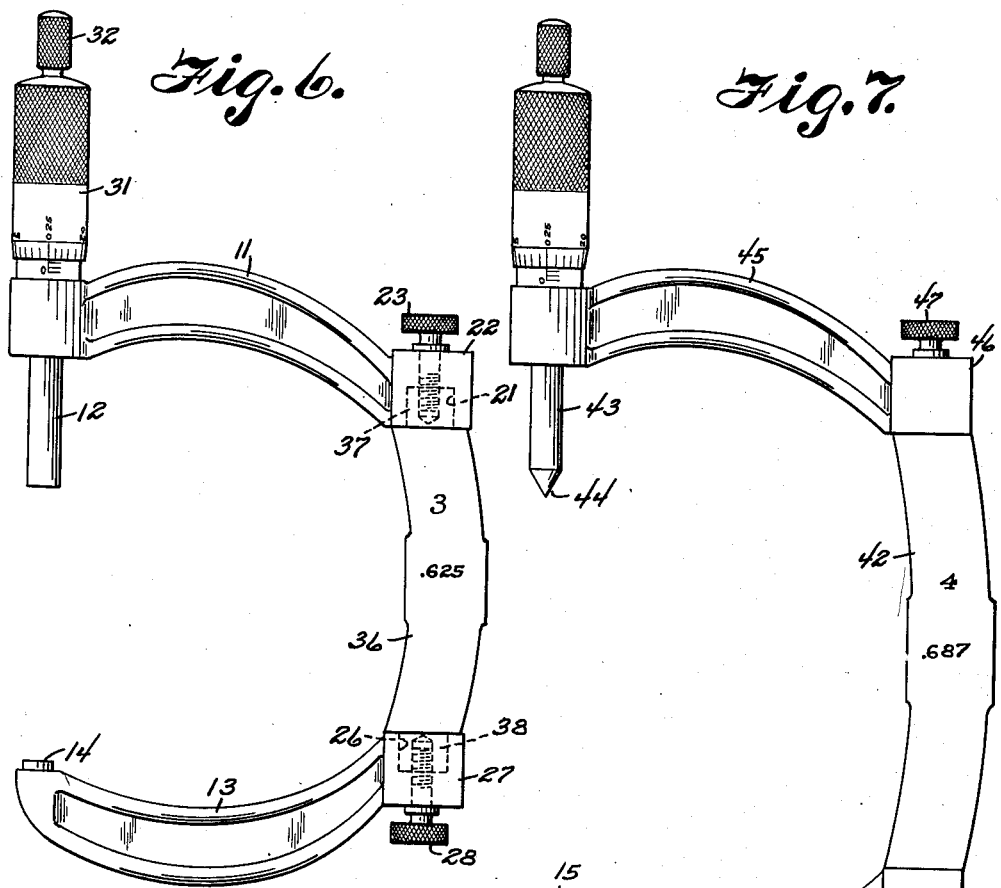
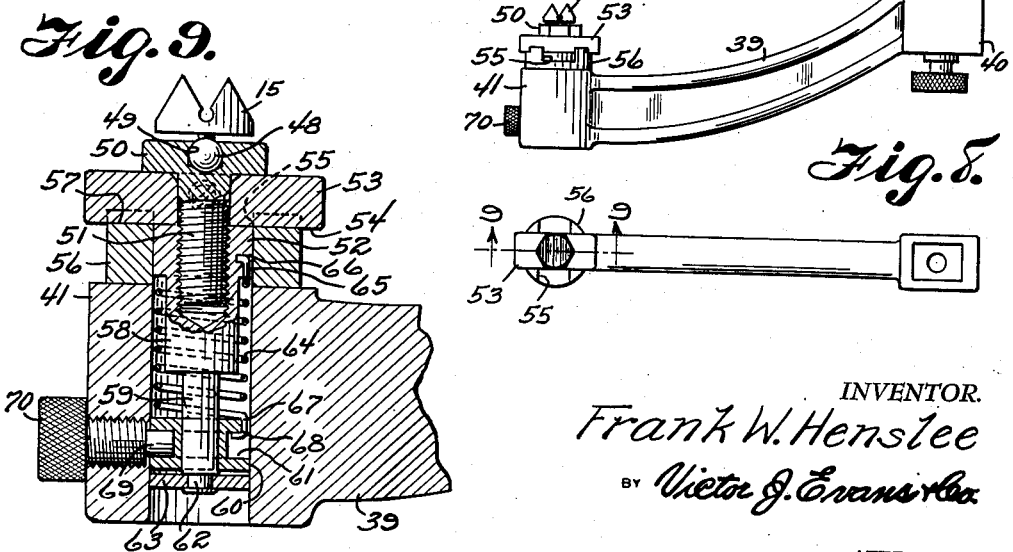
INVENTOR.
Frank W. Henslee
BY *Victor J. Evans & Co.*
ATTORNEYS Jan. 12, 1954 F. W. HENSLEE 2,665,491
MICROMETER THREAD GAUGE
Filed April 14, 1950 3 Sheets-Sheet 3

INVENTOR.
Frank W. Henslee
BY Victor J. Evans & Co.
ATTORNEYS

Patented Jan. 12, 1954

2,665,491

UNITED STATES PATENT OFFICE 2,665,491

MICROMETER THREAD GAUGE

Frank W. Henslee, Pilot Rock, Oreg.

Application April 14, 1950, Serial No. 155,962

2 Claims. (Cl. 33—167)

This invention relates to micrometers and other scientific measuring instruments, and in particular a micrometer including two separable arms and a plurality of spacer bars of different lengths with the bars forming the back or frame of the micrometer and with one of the arms carrying the anvil and the other the adjustable spindle whereby with spacer bars of different lengths an extended range of measurements, such as from zero to twelve inches, may be checked with the same micrometer.

The purpose of this invention is to provide means for attaching arms of a micrometer to spacer bars of different lengths whereby a precision instrument for checking an extended range of dimensions is obtained.

Attempts have been made to extend the size of a micrometer particularly by bolting through the jaws and spacing elements but these devices require sets of bolts and spacing elements and it has been found difficult to hold the anvil and spindle in absolute alignment. With this thought in mind this invention contemplates a micrometer having separable jaws or arms wherein the arms are mounted on the ends of spacing elements through square sockets in the arms that receive square ends or projections of the spacer bars and in which each arm is provided with a thumb screw by which it is secured on the end of the spacer bar.

The object of this invention is, therefore, to provide means for attaching arms of a micrometer to a back or frame wherein the frame is formed of a set of spacer bars of different lengths and wherein the arms are attached to the ends of the spacer bars through square sockets whereby an anvil in one arm is in alignment with an adjusting spindle in the other arm.

Another object of the invention is to provide a micrometer having arms carried by the ends of spacer bars in which spacer bars of different lengths may be substituted by the average layman.

Another object of the invention is to provide attachments for an extensible micrometer whereby the micrometer is adapted for checking thread gauges and the like.

A further object of the invention is to provide a combination extensible micrometer and thread gauge which is of a comparatively simple and economical construction.

With these and other objects and advantages in view the invention embodies a micrometer including anvil and spindle holding arms removably mounted on the ends of spacer bars wherein the arms are attached to the spacer bars with thumb screws in the arms threaded into square projections on the ends of the bars and wherein the projections are positioned in similarly shaped sockets in the ends of the arms.

Other features and advantages of the invention will appear from the following description taken in connection with the drawings wherein:

Figure 1 is a side elevational view of a micrometer having anvil and spindle holding arms mounted on the ends of a short spacer bar by thumb screws with parts of the mounting ends of the arms broken away and shown in sections.

Figure 2 is a plan view looking toward the end of the micrometer and looking downward upon the upper side of the spindle holding arm as shown in Figure 1.

Figure 3 is a plan view showing the anvil holding arm with other parts omitted.

Figure 4 is a detail illustrating one of the spacer bars with other parts omitted.

Figure 5 is a side elevational view similar to that shown in Figure 1 illustrating an elongated spacer bar positioned between the spindle and anvil holding arms.

Figure 6 is a similar view showing an arcuate spacer bar between the arms.

Figure 7 is also a similar view showing a modification wherein a dress gauge element is carried by the anvil holding arm.

Figure 8 is a plan view of the lower arm of the micrometer with the dress gauge element therein and with other parts omitted.

Figure 9 is a vertical section taken on line 9—9 of Figure 8 illustrating the mounting of the thread gauging attachment.

Figure 10:
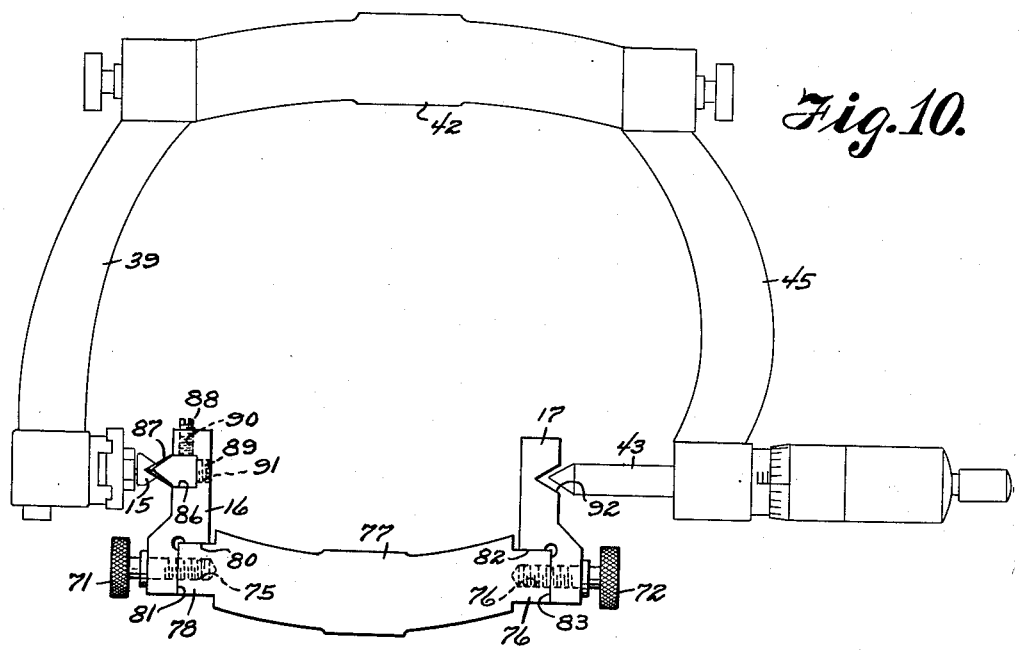
Figure 10 is a side elevational view of the micrometer similar to that shown in Figure 7 and illustrating a thread micrometer checking gauge in combination therewith.
Figure 11:
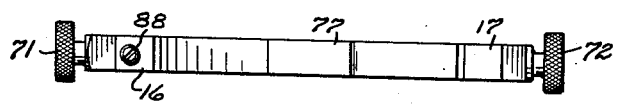
Figure 11 is a view looking upwardly toward the under side of the thread micrometer checking gauge shown in Figure 10.
Figures 12, 13:
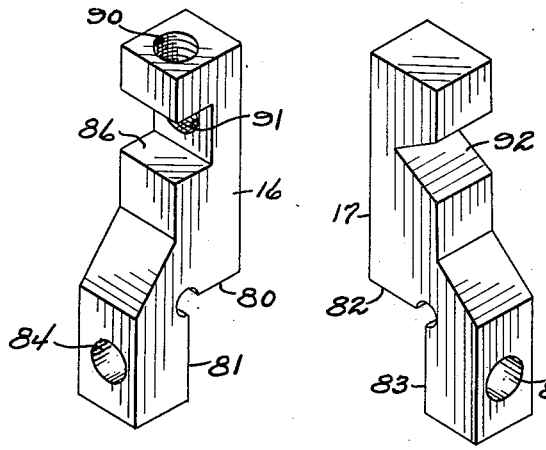
Figure 12 is a detail illustrating the anvil holding jaw of the checking gauge.
Figure 13 is a similar view showing the spindle receiving slot jaw of the checking gauge.

Referring now to the drawings wherein like reference characters denote corresponding parts the extensible micrometer of this invention includes a spacer bar 10, an arm 11 for holding a spindle 12, an arm 13 in which an anvil 14 is carried, a thread engaging jaw 15, and jaws 16 and 17 and a spacer block 18 of a thread micrometer checking gauge.

The spacer bar 10 is provided with rectangular shaped projections 19 and 20 that fit snugly in sockets in the ends of the arms 11 and 13, respectively and, as illustrated in Figure 1 the projections 19 are secured in a socket 21 of a hub 22 of the arm 11 by a thumb screw 23 and extends through an opening 24 in the hub and into a threaded socket 25 in the projection 19. The projection 20 on the opposite end of the spacer bar 10 is secured in a socket 26 of a hub 27 of the arm 13 by a thumb screw 28 that extends through an opening 29 in the hub and is threaded into a threaded socket 30 in the projection 20. With the intermediate part of the spacer bar 10 down to an exact dimension, such as one-half of an inch, the arms 11 and 13 are accurately positioned whereby objects between the anvil 14 and spindle 12 may be definitely measured or scientifically checked. The spindle is actuated by a threaded sleeve 31 having a graduated end of the usual type and the usual lock screw 32 extends from the end of the sleeve. The spacer bars 10 are provided in sets with the intermediate part of each bar of a different length, such as from one-half inch to twelve inches, and these bars may be straight as shown in Figure 1 or arcuate as shown in Figure 6. In Figure 5 an elongated bar 33 is used in place of the bar 10 and the ends of this bar are provided with rectangular shaped projections 34 and 35 similar to the projections 19 and 20, respectively. These projections are also provided with threaded sockets similar to the sockets 25 and 30, and the arms 11 and 12 are secured on the projections by the thumbscrews 23 and 28 as shown.

In Figure 6 the spacer bar 10 is replaced by an arcuate spacer bar 36 and the ends of this bar are also provided with rectangular shaped projections 37 and 38 similar to the projections 19 and 20 and these projections are secured in the sockets of the hubs 22 and 27 of the arms 11 and 13, respectively, by the thumb screws 23 and 28.

In Figures 7, 8 and 9 the arm 13 is replaced by an arm 39, the inner end of which is provided with a hub 40 similar to the hub 27, and the outer end of which is provided with a hub 41 in which the thread gauging jaw 15 is mounted as illustrated in Figure 9. In this illustration the spacer bar 10 is replaced by an arcuate spacer bar 42 and the spindle 12 is replaced by a spindle 43 having a point 44 on the end. The spindle 43 is carried in the outer end of an arm 45 similar to the arm 11 and the arm is removably mounted on the end of a spacer bar 42 through a hub 46 corresponding to the hub 22 and a thumb screw 47 which is threaded into a projection on the end of the bar 42 that is similar to the projection 19.

The thread gauging jaw 15, as illustrated in Figure 9 is mounted through a swivel joint formed by a ball 48 in a socket 49, in a head 50 of a screw 51 which is threaded into a stem 52 of a head 53. The head 53 is provided with a tongue 54 on the under surface which, in assembling is positioned in a laterally deposed slot 55 in a base 56 in which, in use, is turned through an angle of 90 degrees whereby the tongue 54 is positioned in a slot 57, as shown in Figure 9.

The inner part of the stem 52 of a head 53 is provided with a cylindrical section 58 of a diameter and a pin 59 extends from the section 58 through a collar 60 having a groove 61 therein and which is secured on the end 62 of the pin by a washer 63, the end 62 of the pin being peened over or riveted to secure the washer 63 in position. A spring 64 is positioned around the stem and pin and with one end 65 of the spring positioned in a notch 66 of the stem 52 and the other end 67 extended to a notch 68 in the upper flange of a counter 60 are held in tension whereby the thread gauging jaw 15 is resiliently held against the upper surface of the hub 41.

The parts are assembled with the tongue 54 in the laterally disposed groove 55 of the base 56 and after the pin 69 on the inner end of the thumb screw 70 is positioned in the groove 61 of the counter 60 the head 53 is drawn outwardly against the tension of the spring and turned through an angle of 90 degrees by the tongue 54 into the longitudinally disposed groove 57, positioning the head 53 in the position as illustrated in Figures 8 and 10.

With the thread gauging jaw 15 mounted in one of the arms of the micrometer in this manner the fixed diameter of threads on an object positioned between the spindle and the thread gauging jaw are checked.

Figure 14:
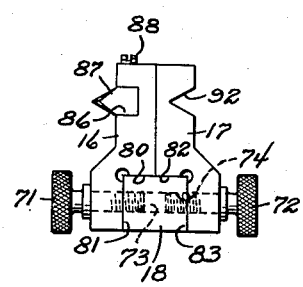
Figure 14 is a side elevational view showing the jaws of the thread micrometer checking gauge assemble on a gauge block.

The thread micrometer checking gauge, as illustrated in Figures 10 to 14 inclusive is used with the micrometer as illustrated in Figure 7 and, as illustrated in Figures 10 and 14 the jaws 16 and 17 are provided with thumb screws 71 and 72, respectively by which they are secured on the ends of a spacer block 18 with the screws held in threaded sockets 73 and 74 in the ends of the block or in threaded sockets 75 and 76 of a spacer bar 77, similar to the bar 42, wherein projections 78 and 79 on the ends of the bar 77 are positioned against flat surfaces 80 and 81 of the jaw 16, and 82 and 83 of a jaw 17. The jaw 16 is provided with an opening 84 in which the thumb screw 71 is positioned and the jaw 17 is provided with an opening 85 in which the thumb screw 72 is positioned.

The jaw 16 is formed with a transversely disposed socket 86 in which a V-shaped anvil 87 is held by set screws 88 and 89 which are threaded in openings 90 and 91, respectively and the jaw 17 is provided with a transversely disposed V-shaped slot 92.

With the parts arranged in this manner the jaws 16 and 17 may be mounted on spacer bars 10, 33, 36, 77 or the like whereby they may be positioned to correspond with objects of different sizes and on which threads of different pitch diameters and pitch are provided.

The extensible micrometer of this invention may, therefore, be used for scientifically measuring and checking plain or threaded objects and the range of sizes is substantially unlimited. The parts are interchangeable and are readily assembled and taken apart as desired.

It will be understood that other modifications may be made in the design and arrangement of the parts without departing from the spirit of the invention.

What is claimed is:

1. In a micrometer, an anvil arm having a thread gauging jaw thereon, a stem having a head with a tongue on the undersurface positioned in the anvil arm, a base having slots in the upper surface positioned on the hub on the end of the anvil arm, said slot of the space positioned at an angle of 90 degrees in relation to each other, a screw arranged in the said stem through the head thereof and having a ball receiving socket in the upper end, a thread gauging jaw carried by a ball positioned in the socket of the head of the screw providing a swivel connection, said stem having a pin extended from the lower end, a collar positioned on said stem, a thumb screw threaded into the hub of the anvil arm and having a pin on the inner end extended into locking engagement with the collar on the pin of the stem, a spring positioned around the stem and resiliently urging a thread gauge jaw toward the hub of the anvil arm of the micrometer.

2. In a micrometer, an arm provided with an opening, a base mounted on said arm and provided with an opening registering with the opening in said arm, a head having a stem extending into said openings, a cylindrical section of reduced diameter extending inwardly from said stem, a pin extending from said cylindrical section, a collar mounted in the opening in said arm for receiving said pin, a coil spring circumposed on said cylindrical section and pin, there being notches in said collar and in said stem for reeciving the ends of said coil spring, a screw arranged in threaded engagement with said head and stem, said screw being provided with a socket, a ball movably mounted in said socket, a thread gauging jaw connected to said ball, said collar having a groove therein, a thumb screw arranged in engagement with said arm and including a pin for projecting into the groove in said collar.

FRANK W. HENSLEE.

References Cited in the file of this patent

UNITED STATES PATENTS

| Number | Name | Date |
|---|---|---|
| 1,033,346 | Reamy | July 23, 1912 |
| 1,074,552 | Kline | Sept. 30, 1913 |
| 1,318,726 | Ciha | Oct. 14, 1919 |
| 1,489,575 | Hanson | Apr. 8, 1924 |
| 1,921,899 | Webbeking | Aug. 8, 1933 |

FOREIGN PATENTS

| Number | Country | Date |
|---|---|---|
| 15,582 | Great Britain | 1907 |
| 39,340 | Norway | July 21, 1924 |
| 584,078 | Great Britain | Oct. 24, 1945 |

OTHER REFERENCES

Publication, Johansson Gauge Blocks and Accessories, C. E. Johansson Inc., page 6, 1930 edition, Division of Ford Motor Co., Detroit, Michigan.